Feb. 2, 1954　　　　　　　E. B. TIDD　　　　　　2,668,216
CONTROL MEANS FOR HEATING SYSTEMS
Filed Aug. 8, 1950　　　　　　　　　　　　6 Sheets-Sheet 1
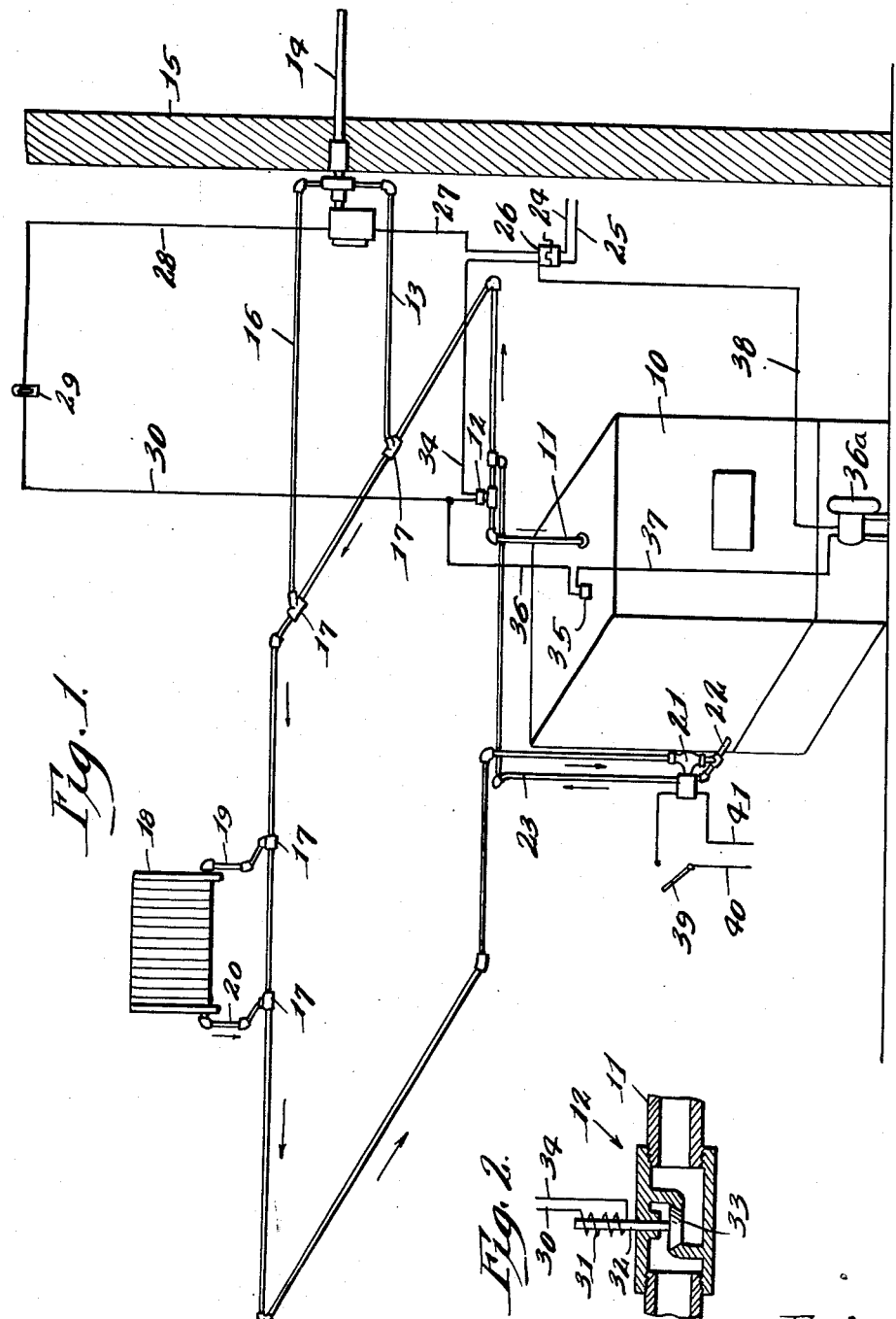
Inventor:
Edwin B. Tidd.
By. John W. Darley
Attorney.

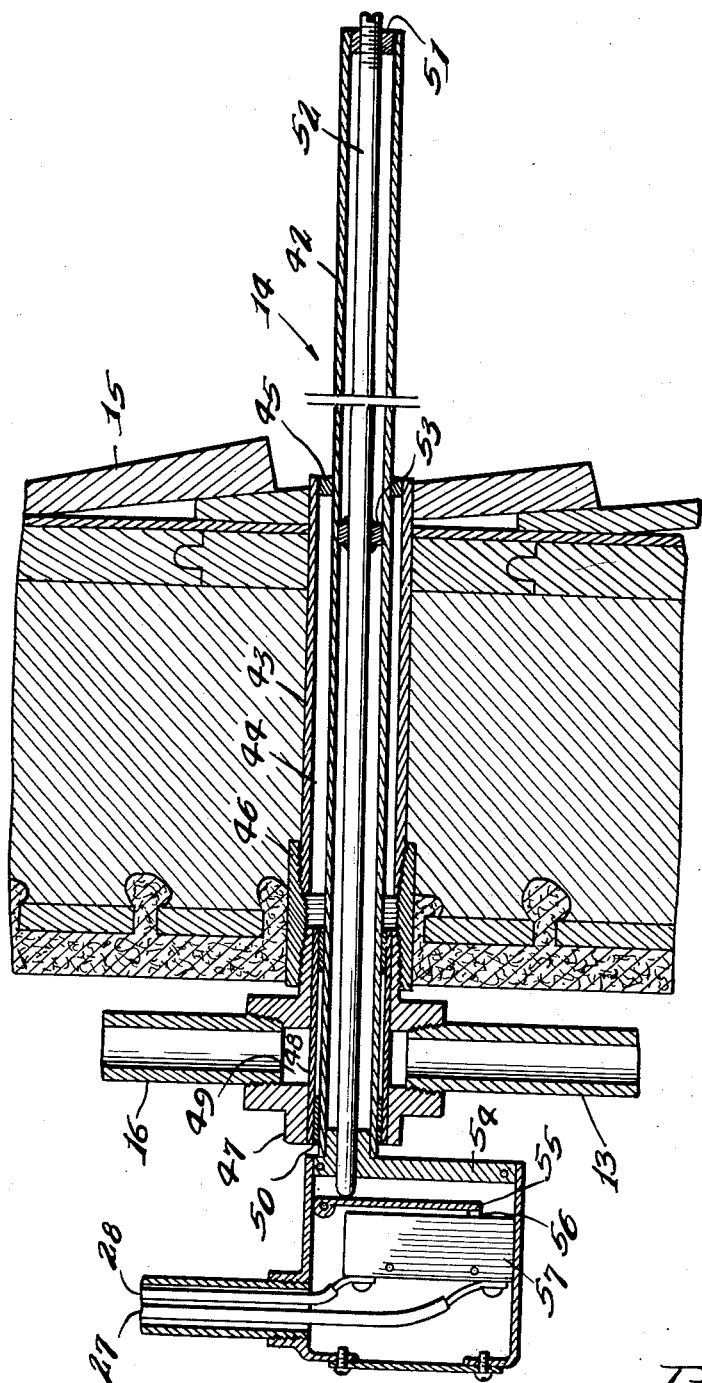

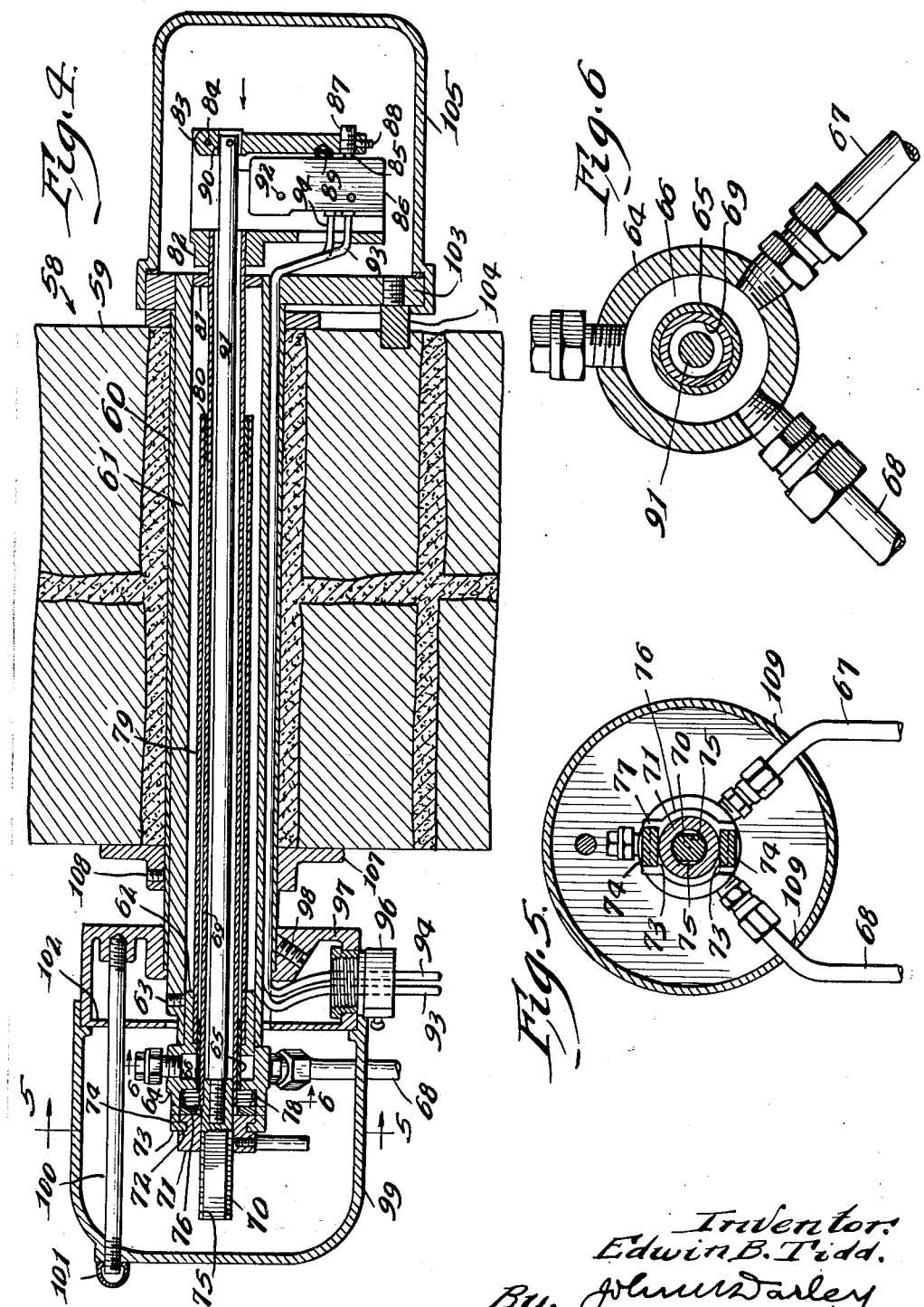

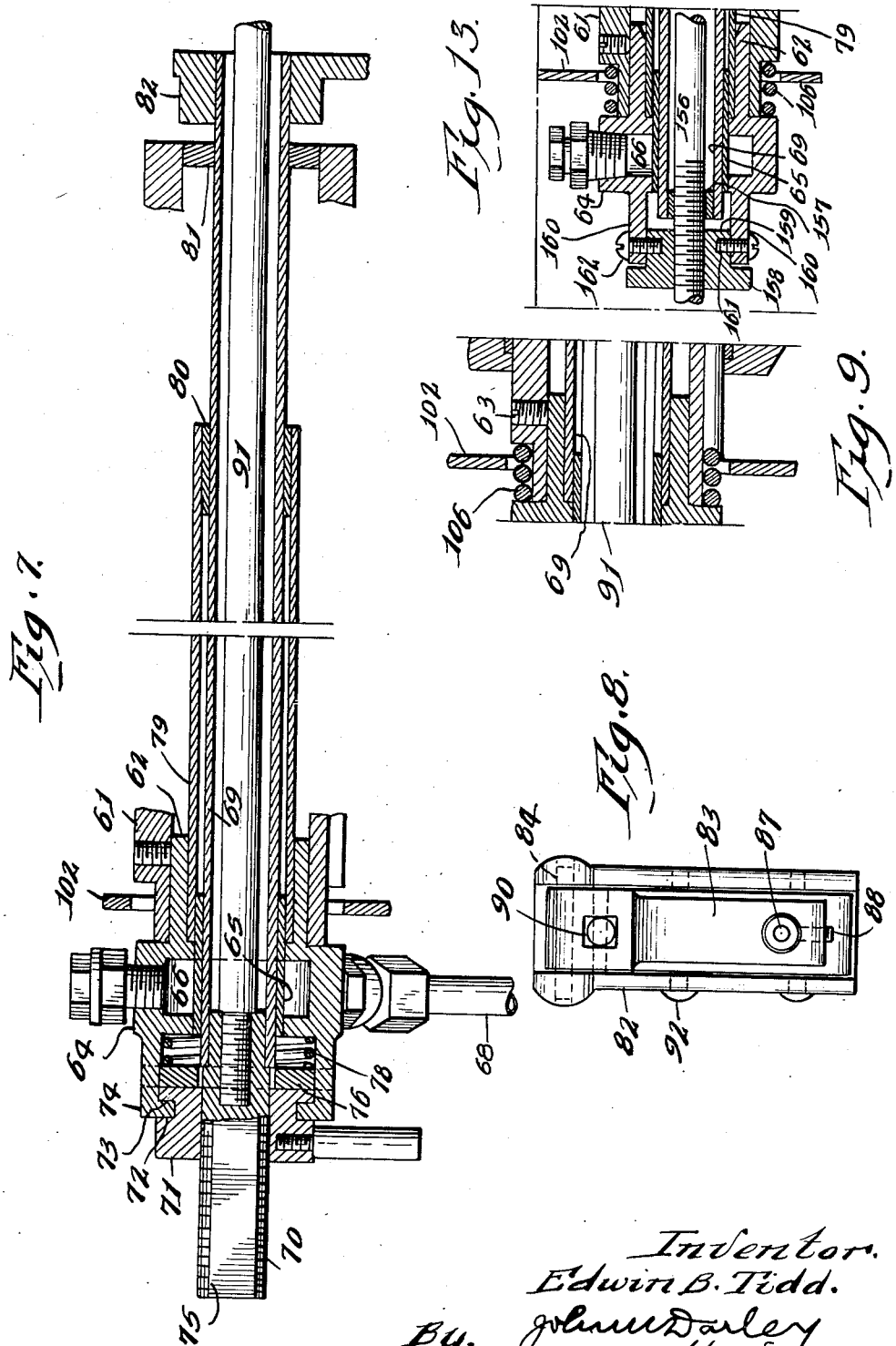

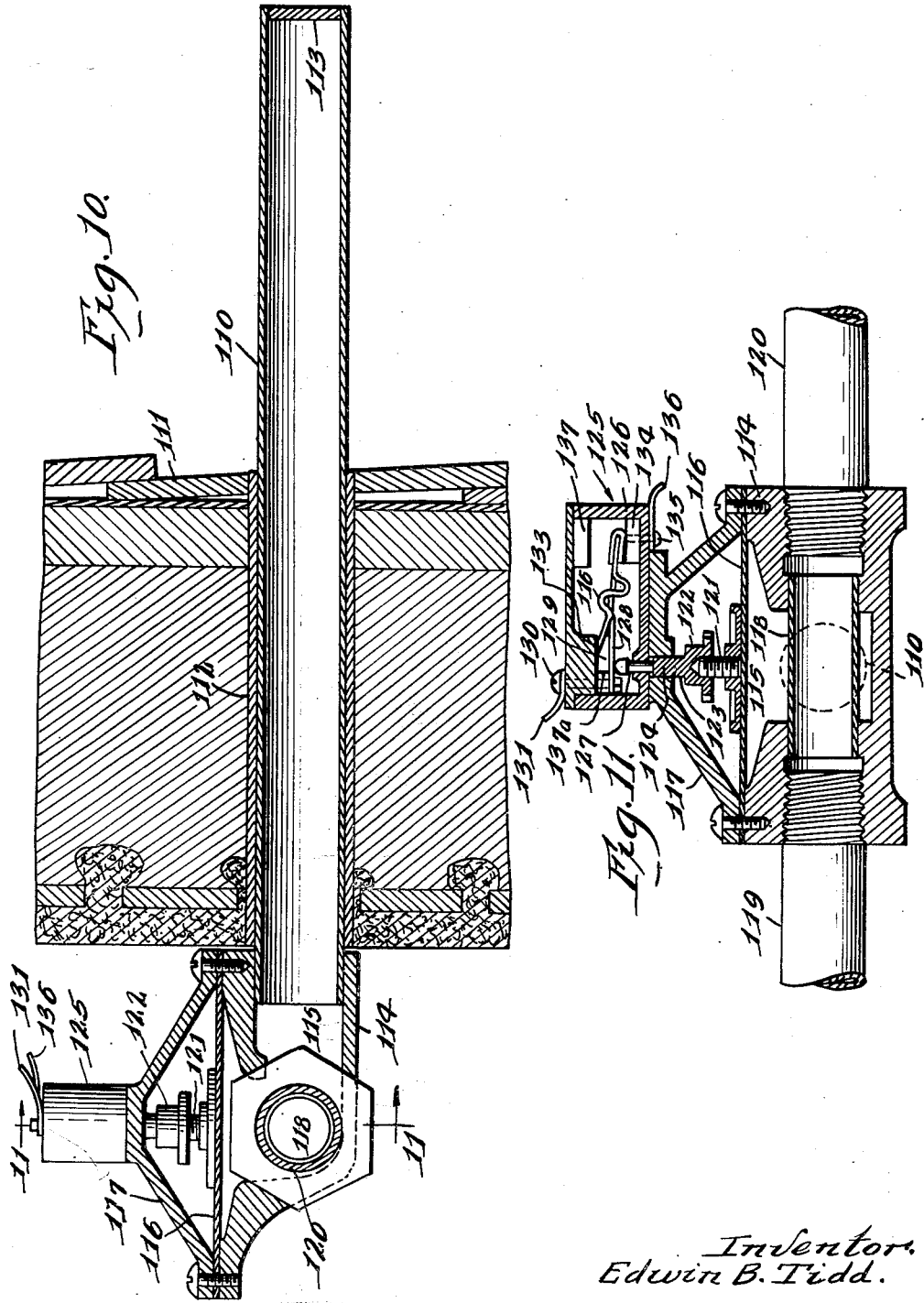

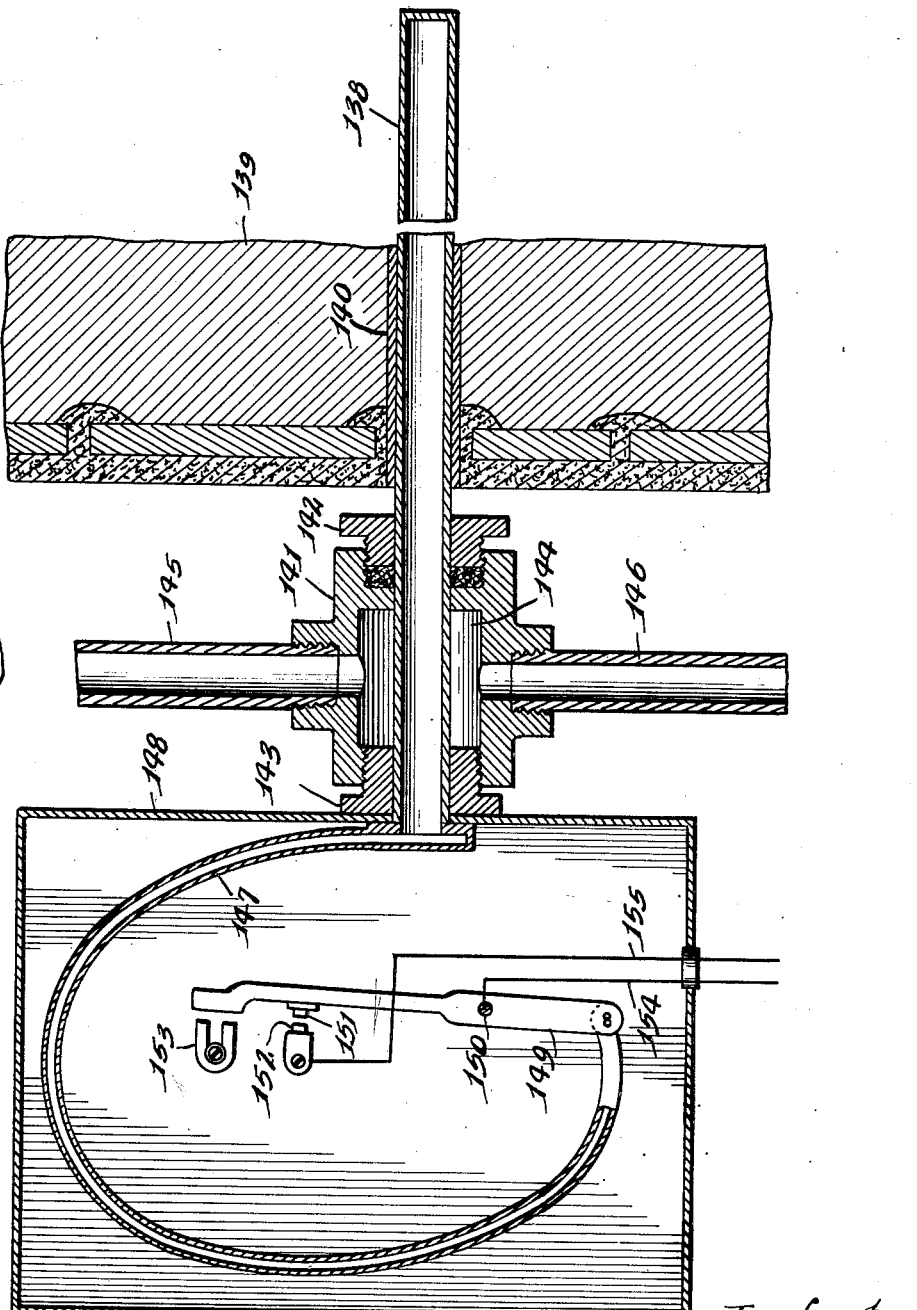

UNITED STATES PATENT OFFICE 2,668,216

CONTROL MEANS FOR HEATING SYSTEMS

Edwin B. Tidd, Mount Prospect, Ill., assignor to Bell & Gossett Company, Morton Grove, Ill., a corporation of Illinois Application August 8, 1950, Serial No. 178,272

18 Claims. (Cl. 200—137)

My invention relates to control means for a heating system and more particularly to a construction and arrangement thereof which efficiently and economically maintains a substantially uniform temperature in the space to be heated, regardless of variations in the external weather conditions.

For purpose of disclosure, the invention will be described in connection with a forcibly circulated, hot water heating system, but it will be understood that the invention is applicable to any fluid heating system, including those utilizing hot air and steam, and without regard to the method of firing the heat source, i. e., boiler or furnace. The latter, regarded generally as a reservoir of heating medium, may therefore be fired with liquid, gaseous or solid fuels and, in the case of solid fuels, the firing may be by hand or automatically controlled.

To insure maximum body comfort in any given space, it is important that the heating system maintain a substantially constant temperature condition in the space. In other words, the temperature throughout a room should be as nearly uniform as possible so that there will be a minimum temperature differential between the floor and the ceiling. During the heating season, every such space is subject to a heat loss which varies with changes in the external weather conditions and unless this loss is compensated by a heat supply under conditions of continuous balance, it is obvious that the space will not be heated properly. Factors which influence this loss for any given installation are the outdoor temperature, rain, snow, sun and wind. The heat loss therefore will be greater during periods of severe weather than on mild days and, importantly, as between windy and still days having the same temperature, the heat loss will be greater on the windy days. Hence, a heating system which is not sufficiently flexible to handle these variables will fall short of providing adequate heat under all conditions.

The problem involved can be readily understood by considering the limitations of a common type of forcibly circulated, hot water heating system. A minimum temperature is maintained in the boiler of such a system by an "aquastat" connected to the firing device and the pump is controlled by a room thermostat set to theoretically maintain a desired temperature in the space being heated. Heat supply to the space is therefore intermittent and this condition renders impossible any close regulation of the desired temperature. Not only is there a considerable lag between the heating of the radiators and the response of the thermostat, but the inertia of the system is such that when the thermostat opens, the radiators have been heated to a temperature higher than the conditions require, thus resulting in a waste of heat. Moreover, when the pump stops, the convection circulation of air in the room gradually slows down and the air stratifies. If, for example, the thermostat is set for 70° F., the temperature at the level of the thermostat may be of this order, but near the ceiling the temperature will be several degrees higher and near the floor the temperature will be several degrees lower. This condition, known as "cold 70°," is objectionable in that it produces body discomfort and is not rectified until air circulation is restored in the room by a fresh supply of heat to the radiators. This correction is not only temporary, but produces the overheated situation noted above. With a system of this type, it is accordingly impossible to maintain a continuous balance between heat loss and heat supply and therefore a close regulation of the desired temperature, because there is no control factor which is intimately and directly affected by changes in outside weather conditions which determine the rate of heat loss.

Attempts to solve the above problem generally have taken two forms. In one type, controlling devices have been connected through small diameter tubes to bulbs respectively exposed to the heating fluid and to the outside air, the bulbs and tubes being filled with a heat expansible liquid whose pressure changes as the temperatures to which they are subjected vary. Such an arrangement is responsive to temperature changes only and is incapable of responding to variations in heat loss on windy days due to the negligible heat conduction along the small diameter tubes. In the second type, the outdoor control is associated with means for producing heat electrically in such a manner that the rate of heat dissipation of the heat will vary with wind and outside temperature changes and will exercise a compensating control on the heating system.

It is therefore one object of my invention to devise a control means for a heating system which is arranged for close regulation of the heat demand in the space being heated in accordance with outdoor weather changes by correlating the effect of outdoor and system fluid temperatures.

A further object is to provide a control means having the foregoing characteristics which is further conditioned for response to the increased heat demands that occur on windy days during the heating season.

A further object is to provide an outdoor control for regulating a heating system in which the operation of a circuit controlling switch mechanism is determined by simultaneously exposing opposite ends of a heat conducting tube to the heating fluid and the outside air, the heat conditioning of the tube by these temperatures determining the extent of the control and the device being therefore responsive to outdoor temperature and wind variations.

A further object is to provide a control means as above indicated which is adjustable to establish a desired temperature of the circulating heating fluid to satisfy the heat demands of the space being heated in relation to any outdoor temperature.

This application is a continuation in part of my copending application for Heating System, Ser. No. 756,615, filed June 24, 1947, now Patent No. 2,626,755, January 27, 1953.

These and further objects of the invention will be set forth in the following specification, reference being had to the accompanying drawings and the novel means by which said objects are effectuated will be definitely pointed out in the claims.

In the drawings:

Fig. 1 is a schematic, isometric elevation of a one-pipe, hot water heating system equipped in accordance with one phase of the invention and in which the circulating pump runs continuously during the heating season.

Fig. 2 is a diagrammatic, sectional elevation of a solenoid operated valve which operates as a flow control member in the system shown in Fig. 1.

Fig. 3 is an enlarged, sectional view of the outdoor control employed in Fig. 1.

Fig. 4 is a sectional elevation of a modified form of the control.

Fig. 5 is a section along the line 5—5 in Fig. 4.

Fig. 6 is an enlarged section along the line 6—6 in Fig. 4.

Fig. 7 is an enlarged, fragmentary section of the control means as viewed in Fig. 4.

Fig. 8 is a view of the switch housing and associated parts looking in the direction of the arrow 8 in Fig. 4.

Fig. 9 is a sectional elevation of a portion of the Fig. 4 control showing the manner in which the switch wires are wrapped around the control when the latter is pushed through the building wall.

Fig. 10 is a sectional elevation of a further modified form of the control which utilizes a gas or liquid filled casing that is responsive to outside weather conditions and the heating fluid.

Fig. 11 is a section along the line 11—11 in Fig. 10.

Fig. 12 is a sectional elevation showing a further modification using a gas or liquid filled casing as in Fig. 10 and associating this casing with a Bourdon tube and switching elements.

Fig. 13 is a fragmentary, sectional view showing a modified adjustment for the control illustrated in Figs. 4 and 7.

Referring to Figs. 1 and 2, the numeral 10 designates a hot water heating boiler from which leads a supply pipe 11 in which is interposed a flow control element in the form of an electrically operated valve, denoted generally by the numeral 12. By way of example, this valve is indicated as being of the solenoid operated type, but a motor operated valve may be used if desired, many types of the latter valve being well known in the art. On the discharge side of the valve 12, a pipe 13 connects the pipe 11 with the water inlet of an outdoor control 14 which extends through the building wall 15 a distance sufficient to insure that its outside extremity will be subject to weather changes, although as presently noted the position of the control is capable of being varied. The water outlet of the control 14 is connected by a pipe 16 with the pipe 11, the water inlet and outlet being located inwardly of the wall 15. To insure adequate water flow through the inner end of the control so that the regulating action of the latter will be accurate and substantial, the pipes 13 and 16 are connected to the pipe 11 by fittings 17 which are specially designed for one-pipe systems and embody the principles outlined in United States Letters Patent, No. 1,663,271, dated March 20, 1928.

The pipe 11 is connected to any desired number of radiators, such as 18, and each radiator is connected by supply and return pipes 19 and 20 to the pipe 11 through fittings 17 for reasons noted in connection with the control 14. The return portion of the pipe 11 delivers the water to an electrically operated pump 21 whose discharge side is connected by a pipe 22 with the boiler and by a pipe 23 with the pipe 11 between the discharge side of the valve 12 and the connection of the pipe 13 with the pipe 11. Hence, when the valve 12 is closed, the pipe 23 serves as a bypass around the boiler 10, all water then being circulated through the pipe 23 by the pump 21 which runs continuously during the heating season.

Associated with the above piping is an electric circuit which includes the outdoor control 14 as a part thereof and which will now be described. Power wires 24 and 25 are connected to a main switch 26 and from the switch a wire 27 leads to the control 14 whose interior construction is more particularly illustrated in Fig. 3 and will be presently described. A wire 28 connects the control 14 with a room thermostat 29 positioned to be affected by the radiator 18 and a wire 30 connects the thermostat with a solenoid coil 31 (see Fig. 2) operably related to the stem 32 of a valve element 33 which controls flow through the valve 12. The coil 31 is also connected by a wire 34 with the switch 26, the control 14, thermostat 29 and the electrical portion of the valve 12 being therefore arranged in series so that when the control and thermostat are closed, the valve 12 is open to permit hot water to flow from the boiler.

Bridged around the valve 12 is a circuit which includes in series relation a high limit or safety "aquastat" 35 mounted in the boiler and responsive to the boiler water temperature, and automatically operated, firing means 36a for the boiler which may be a gas or oil burner, or a mechanical stoker. The "aquastat" 35 is connected by a wire 36 with the wire 30, while a wire 37 connects the "aquastat" with the firing means and the latter is connected by a wire 38 with the switch 26. Since the "aquastat" 35 is always closed under normal operating conditions, it will be obvious that the firing means 36 will be operated simultaneously with the opening of the valve 12 when the thermostat 29 is closed since the firing means and the valve, respectively, are electrically in series with the thermostat 29 and the control 14. Operation of the pump 21 is determined by a switch 39 which controls a circuit supplied by power wires 40 and 41.

The essential features of the control are illustrated in Fig. 3 to which reference will now be made. Specifically, the control 14 comprises a tube 42 composed of a metal having a relatively high coefficient of expansion, such as brass or copper, which extends through the wall 15 with its opposite ends projecting beyond opposite sides of the wall, this being the specific position shown in Fig. 1, but is not a limiting position. The tube 42 may be heat shielded from the wall by an enclosing sleeve 43 whose length is almost equal to the thickness of the wall and which is spaced from the tube to provide a dead air chamber 44. The outside end of the sleeve 43 is closed by an annulus 45 while the other end is threaded in one end of a pipe coupling 46 whose opposite extremity terminates at the inner surface of the wall 15. A sleeve composed of suitable insulating material may be substituted for the dead air space if desired.

Threaded in the inner end of the coupling 46 and surrounding the same end of the tube 42 is a header 47 in which are respectively threaded the outlet and inlet ends of pipes 13 and 16. A copper sleeve 48, or one having equal heat conducting properties, extends through the header 47 in concentric and spaced relation to the tube 42, thus forming internally of the header an annular chamber 49 which communicates with the pipes 13 and 16. A frictional, heat conducting fit between the tube 42 and sleeve 48 is achieved by split, copper bushings 50—50 which are inserted in the ends of the sleeve. Hence, since water flowing through the pipes 13 and 16 bathes an intermediate, external portion of the sleeve 48 which in turn is in heat conducting relation to the inner end of the tube 42 through the bushings 50, the tube is constantly exposed at its opposite ends to the temperature of the heating fluid flowing through the system and to outside weather conditions, respectively.

The outer end of the tube 42 is closed by a plug 51 secured thereto and threaded through this plug is the slotted outer end of a rod 52, preferably composed of a non-expansible material such as Invar which extends through the tube in coaxial relation thereto and is guided internally thereof by a collar 53 fast on the rod. The inner end of the rod 52 is slidable through the adjacent wall of a switch housing 54 secured to the tube 42 and is operably related to an intermediate portion of a rock lever 55 pivoted interiorly of the housing 54 and having its free end actuatingly related to a plunger 56 forming part of a snap action switch 57 to which are connected the wires 27 and 28. The switch 57 is preferably of the type which requires only a very slight movement to shift the switching element from a first to a second position and when the actuating force is removed, the element automatically returns to the first position. A switch of this type is disclosed in United States Letters Patent No. 1,960,020, dated May 22, 1934, and its essential details are shown in Fig. 11 of this application, with the exception that, in the Fig. 3 construction as in the patented switch, the plunger 56 is moved inwardly and outwardly of the switch to make and break the circuit therethrough while the reverse situation is true in the form shown in Fig. 11.

From the foregoing, it will be understood that, since the tube 42 is free to lengthen and shorten in response to the mutually modifying actions of the circulating heating fluid and the outside temperature and general weather conditions and since these length changes effect movements of the connected rod 52 due to its substantially zero expansion coefficient, means are thus provided for regulating the heating system. The control may be adjusted to meet different operating conditions by changing the relative positions of the tube 42 and rod 52 by screwing the rod inwardly or outwardly of the tube, or by varying the length of the tube exposed to the outside weather through slipping the tube inwardly or outwardly of the wall 15, or by a combination of these factors, and including positions in which the outer end of the control does not project beyond the outer surface of the wall. In the latter instance, the outside weather acts through the building wall to condition the outer end of the control 14.

It will be assumed that the control 14 has been adjusted to maintain a desired temperature condition in the space to be heated; this adjustment once made for an installation need not be disturbed for thereafter its operation is automatic. So long as heat is not required indoors, for example during the summer season, the control 14 and the thermostat 29 are open, the valve 12 and the "aquastat" 35 are closed, and the firing means 36 is not operating. Under these conditions, the control 14 is open because the outside temperature is such that the tube 42 has lengthened sufficiently to open the switch 57. The switch 39 is also open so that the pump 21 is not running.

When the outdoor temperature falls to a point at which heat is required indoors, for example, at the beginning of the heating season when the boiler is cold, the switch 39 is closed thus initiating a flow of water through the system. This switch may be closed manually, or automatically by an outdoor thermostat set to close at an outside temperature which will insure that the pump runs continuously during the heating season, and the diagrammatic illustration of the pump circuit in Fig. 1 is intended to be generically inclusive of either arrangement. Due to the drop in the outside temperature, the tube 42 shortens enough to close the controlling circuit through the switch 57, and the thermostat 29 is closed since it is then demanding heat. The control circuit is therefore completed so that the valve 12 opens to permit flow through the boiler 10 and the firing means 36 begins operating.

As the temperature of the water in the system rises, the heat thereof is applied to the inner end of the tube 42 and is conducted therealong towards the colder, outer end of the tube. This heat conductance provides the control factor for the system and it will be obvious that its rate will be higher on cold than on mild days, and, further, that the dissipation of heat at the outdoor end of the tube will be higher on windy than on still days even though the windy and still days may register the same temperature on a thermometer. In other words, a higher water temperature in the system will be required to open the switch 57 on cold days than on milder days and a comparable situation will exist on windy, cold days in relation to still, cold days. The hot and cold ends of the tube 42 may be regarded as mutually modifying forces whose actions are correlated or coordinated by the tube to produce an efficient control on the system which substantially balances the heat supply and the heat loss under variant weather conditions.

For example, under the conditions mentioned above and assuming an outside temperature of 65° F., a water temperature of 90° F. may be sufficient to interrupt the circuit, thus closing the valve 12 and stopping the firing means 36, even though the thermostat 29 is not satisfied. However, the heat then in the system continues to be circulated through the radiators since the pump runs continuously and moves the water through the bypass 23. As heat is dissipated in the space being heated, this condition is reflected in a lowered water temperature at the inner end of the control 14 and therefore a contraction of the tube 42. Hence, the control 14 again closes to cause a fresh supply of hot water from the boiler 10 to enter the system, this supply being slightly tempered by the relatively colder water moving through the bypass 23. Eventually, the rise in system water temperature effects an opening of the control 14 with accompanying results as noted above. These repeated supplies of hot water from the boiler continue until the thermostat 29 is satisfied and thereafter heated water always courses through the system, thus eliminating stratification of air in the space being heated and avoiding the possibility of a "cold 70°" condition.

If the outdoor temperature drops to 0° F., the firing means 36 will operate and the valve 12 will open for longer periods to thereby establish the higher water temperature required to satisfy the increased heat demand in the space and the control 14 before the latter opens.

It is contemplated that the thermostat 29 would be used in well insulated buildings and might be omitted in those where the heat loss is more rapid and, in the latter case, the control 14 would determine directly the operation of the valve 12 and the firing means 36.

The foregoing means of control effectively anticipates heat demands in the space under all weather conditions and due to the principle of coordinating heat conduction along the tube 42, it is characterized by the outstanding advantage relative to bulb systems of control of compensating for increased heat losses on windy days. Further, the control 14 is more compact than the bulb arrangement and is capable of easier association with a heating system.

In Figs. 4 to 9, inclusive, is illustrated a modified form of the control, generally indicated by the numeral 58, which is characterized by adjustability that enables the control to establish, in relation to any outdoor temperature, any desired temperature of the heating fluid within a reasonable range.

As before, the control 58 extends through a building wall 59 and it includes an outside sleeve 60 whose length is sufficient to extend completely through the wall and which is preferably made of copper tubing because of its resistance to corrosion. Fitting within the sleeve 60 is a sleeve 61 which may be made from any of the commercial types of plastics and which extends for a convenient distance beyond the left, or inner, and the right, or outer, faces of the wall, as viewed in Fig. 4.

A bushing 62 fits within the inner end of the sleeve 61 and is secured thereto by a set screw 63. This bushing is integrally formed with a heat block 64 which is located beyond the inner end of the sleeve 61 and is composed of brass or other metal having an equivalent or a higher heat conductivity. An annular channel formed internally of the block 64 is bridged by a copper sleeve 65 to thereby define an annular chamber 66, the sleeve 65 being soldered or otherwise attached to the block for intimate heat exchange therewith and is concentric with the chamber 66 and the bushing 62. Pipes 67 and 68, corresponding to pipes 13 and 16 in Fig. 1, deliver and discharge, all respectively, hot water to and from the chamber 66 to thereby heat the block 64, including the bushing 62, and the sleeve 65.

The inner end of a brass control tube 69 is slidable within and in heat exchange relation to the sleeve 65, the inner extremity of the tube 69 being soldered to the reduced end of an adjusting screw 70 and an adjusting nut 71 being threaded on the screw. The nut 71 is conditioned for a motion of rotation only by means of an annular groove 72 formed peripherally therein and in which fits ears 73—73 provided on laterally extending, upper and lower arms 74—74 integrally formed with the heat block 64. To prevent rotation of the screw 70 when the nut 71 is rotated and to restrict motion of the screw to endwise movements only, the sides of the screw are flatted, as at 75—75, and these flats are engaged by a washer 76 which is apertured to fit the flats. The washer 76 is located between the nut 71 and the heat block 64 and peripheral ears 77—77 on the washer embrace the side faces of the arms 74. A spring 78 encircles the control tube 69 between the block 64 and the washer 76 to maintain the latter in abutting relation to the nut 71.

A copper, heat supply sleeve 79, provided for a purpose presently explained, encircles the control tube 69 and is spaced therefrom for the major portion of its length. The inner end of the sleeve 79 slidably fits within the bushing 62 and, in the position of parts shown in Figs. 4 and 7, fits closely around the sleeve 65, the bushing 62 and sleeve 65 being in heat exchange relationship with the indicated end of the sleeve 79. The opposite end of the sleeve 79, which is at all times included between the ends of the plastic sleeve 61, is soldered to a brass bushing 80 which in turn is soldered to the control tube 69.

From the foregoing, it will be understood that the heat supply sleeve 79 is anchored to the control tube 69 and moves endwise with the latter when the nut 71 is rotated and that, when hot water is circulated through the chamber 66, heat is supplied to the inner end of the control tube 69 through the sleeve 65 and to a part of the tube 69 remote from its inner end by way of the bushing 62, heat supply sleeve 79 and bushing 80.

The outer end of the control tube 69 projects and is slidable through a seal ring 81 which closes the outer end of the sleeve 61 and is soldered to a brass switch housing 82. The upper end of a lever 83 is pivoted at 84 to the housing 82 and its lower end is operably related to the plunger 85 of a switch 86 which is of the same general character as the switch 57 in Fig. 3, except that in this case, an inward movement of the plunger relative to the switch opens the latter and an outward movement closes the switch. The free end of the lever 83 can be adjusted with reference to the plunger 85 by means of an adjusting screw 87 carried by the lever and whose adjusted position is locked by a set screw 88. Movements of the lever 83 towards the switch 86 are resisted by a spring 89 interposed between the lever and the casing of the switch. Adjacent the pivot 84, the lever 83 is apertured as at 90 and one end of an Invar rod 91 is pivoted within the aperture which is sized to permit rocking movements of the lever relative to the rod. The rod 91 extends through the control tube 69 in spaced relation thereto and its inner end is firmly threaded in the adjusting screw 70 so that it moves with the control tube 69 when the latter is adjusted by the nut 71.

The switch 86 is fastened by screws 92 (see Fig. 8) to the housing 82 and wires 93 and 94, comparable to the wires 27 and 28 in Fig. 1, extend from the switch through passages 95—95 in the plastic sleeve 61, only one passage being illustrated in Fig. 4, and thence through a connector 96 for connection to the electrical circuit illustrated in Fig. 1. The connector 96 is carried by a cup-shaped member 97 which is slipped over the inner end of the sleeve 61 and fastened thereto by a set screw 98. A cover 99 encloses the inner end of the control means, including the heat block 64 and is fastened to the member 97 by means of a stud 100 and a nut 101. A wall 102 may be clamped between the member 97 and cover 99 to separate the water pipes 67 and 68 from the wires 93 and 94.

The outer end of the plastic sleeve 61 carries a plastic disk 103 which is held in the position shown in Fig. 4 by a pin 104 carried by the disk and inserted in a pocket 104' in the wall 59. A metallic cover plate 105 is sealably carried by the disk 103 in enclosing and protecting relation to the housing 82 and the parts carried thereby. The only purpose of the cover 105 is to protect the lever 83, switch 86 and Invar rod 91 against rain and the accumulations of snow and ice which might otherwise interfere with the free action of these parts as presently described. The temperature within the metal cover will always be substantially the same as the outdoor temperature and the presence of the cover will not interfere with the heat loss from the outer end of the control, including accelerated losses on windy days.

The operation of the control illustrated in Fig. 4 differs somewhat from that shown in Fig. 3 in that the lengthening and shortening of the control tube 69, in response to the mutual effects of the circulating heating fluid and the outside temperature and general weather conditions including wind, causes a rocking of the lever 83 on the fixed pivot provided by the outer end of the rod 91 which has a zero expansion coefficient. A further difference resides in the fact that means are provided for regulating the quantity of heat supplied to the control tube 69 so that any desired temperature of the heating fluid, within a reasonable range, may be established in relation to any outdoor temperature.

The control is initially adjusted by means of the screw 87 with the parts otherwise in the positions shown in Fig. 4 so that when the entire control is exposed to a temperature of 72° F., which is a characteristic room temperature, the switch 86 will be open. At the place of installation, the member 97 and cover 99 are removed and the control is pushed through a hole in the wall 59 from the outside thereof. Prior to this insertion, the portions of the wires 93 and 94 which extend beyond the inner ends of the passages 95 are wrapped around the reduced, inner end of the sleeve 61, as indicated by the numeral 106 in Fig. 9. Thereafter, the wires 93 and 94 are unwound, led through the connector 96 and attached to the remainder of the electrical circuit as shown in Fig. 1. The control is held against endwise movement by slipping a flange 107 over the inner end of the sleeve 60, suitably attaching the flange to the wall 59 and locking the flange to the sleeve 60 by a set screw 108. The member 97 is then mounted on the inner end of the sleeve 60, followed by the wall 102, and the pipes 67 and 68 are connected to the heat block 64. The cover 99 is then fastened to the member 97, slots 109—109 being provided in the cover to clear the pipes 67 and 68.

If the outdoor temperature at the time of installation is colder than that at which the control was initially adjusted, i. e., 72° F., the switch 86 will close to thereby open the flow control valve 12 and start the burner 36 operating. The temperature of the fluid in the heating system will rise and the fluid will flow through the chamber 66 to thereby transfer heat to the heat block 64, including the bushing 62, and the sleeve 65. Hence, the control tube 69 receives heat in two locations, viz., from the sleeve 65 and from the bushing 80 by way of the heat block bushing 62 and heat supply sleeve 79. As indicated in Fig. 4, heat is transferred from the sleeve 65 to the tube 69 a short distance from the end of the latter in the position of parts illustrated, which distance may be of the order of ¼", while the sleeve 79 has maximum area contact with the bushing 62 and so has transferred thereto the maximum amount of heat available.

The heat transferred through the indicated dual paths to the control tube 69 causes the latter to lengthen and further shift the lever pivot 84 outwardly with respect to the pivotal connection of the lever 83 to the rod 91, thus rocking the lower end of the lever towards the switch plunger 85. If this first run of the control results in an opening of the switch 86 before the temperature of the heating fluid has been raised sufficiently to adequately heat the space being serviced, the nut 71 is rotated a turn or two to shift the control tube 69 and heat supply sleeve 79 towards the right, as viewed in Fig. 4.

This adjustment achieves two purposes with respect to the heat conditioning of the control tube 69. First, heat is applied through the bushing 65 closer to the left end of the tube 69 so that this portion of the heat must travel a longer distance before being subjected to the chilling action of the colder end of this tube, and, second, shifting of the heat supply sleeve 79 towards the right reduces its area of contact with the heat block bushing 62 and hence the amount of heat transferred to the tube 69 through the sleeve 79. The joint result of these two conditions is that a higher temperature must be established in the heating fluid before sufficient heat is transferred to the tube 69 to open the switch. Still higher fluid temperatures may be secured by further rotating the nut 71 in the indicated direction up to the limit of the adjustment when the inner end of the heat supply sleeve 79 separates from the bushing 62. At this point and just prior thereto, it will be noted from Figs. 4 and 7 that the left end of the control tube 69 will have been drawn within the bushing 65 to thereby reduce the heat transfer area between the tube and bushing.

The heat supply sleeve is an important feature of the invention for it enables the control tube to be supplied with heat at a point remote from the primary heat supply, namely, the bushing 65, and closer to the heat dissipating end of the control. This characteristic insures that the switch 86 can be opened with lower temperatures of the heating fluid and yet have such temperatures sufficiently high for space heating purposes. For fuel economy, it is important that the temperature of the circulating fluid be maintained as low as possible as long as it heats the space. An ancillary advantage of the sleeve 79 is that since under normal conditions, it is always heated, it reduces radiant losses from the control tube 69.

As with the control shown in Fig. 3, this control anticipates heat demands under all weather conditions, including wind, but possesses superior qualifications in respect of adjustability and capacity to lower temperatures of the heating fluid.

Where parts in the Fig. 4 control are indicated as being made of copper or brass, it will be understood that such designation is inclusive of other metals having equal or higher heat conducting properties.

In Figs. 10 and 11 is illustrated a variant form of outdoor control. This modification is similar to the controls described above in that it utilizes the coordinating action of variations in the outdoor and heating system fluid temperatures as applied to a heat conducting casing, but differs therefrom in that the temperature variations of the casing are reflected in pressure changes in a fluid sealed in the casing or tube which affect a diaphragm actuated switch.

Specifically, this modification comprises a heat conducting tube 110, similar to the tube 42, which extends through a building wall 111 and is preferably insulated therefrom by a sleeve 112. A substantial portion of the tube projects beyond the outer surface of the wall for exposure to the outside weather and its outer extremity is closed by a plug 113. It will be understood, however, that the control tube 110 may have its position adjusted as described for the tube 14. The inner end of the tube 110 is mounted in an open top housing 114 located inwardly of the wall 111 and which includes a chamber 115 that communicates with the interior of the tube. The top of the housing 114 is closed by a diaphragm 116 clamped thereagainst by a frustoconical cover 117 and the tube 110 and chamber 115 are filled with a suitable gas or liquid sealed in at any desired temperature and pressure. Hence, the diaphragm 116 is responsive to pressure changes in the fluid in the tube 110. Air may be used as a fill, or any of the well known, heat expansible liquids which will not freeze at any of the outdoor temperatures to which the control might be subjected. Bridged across the chamber 115 and in heat exchanging relation with the fluid therein is a tube 118 (see Fig. 11) which is preferably composed of copper or a comparable heat conducting metal and which communicates with the ends of pipes 119 and 120 mounted in the housing 114 and which pipes may be connected to the heating system in accordance with the arrangement shown in Fig. 1.

A threaded stem 121 is fixed to the central part of the top surface of the diaphragm 116 and adjustable on the stem is a nut 122 having an extension 123 which is reciprocable through a hole 124 in the cover 117 and moves with the diaphragm. Th extension 123 is intended to actuate a snap switch 125 which is preferably of the same general type as switch 57, except that upward movement of the diaphragm 116, corresponding to a lessened demand for heat, effects an opening of the switch 125, while a contrary movement, corresponding to an increased demand for heat, effects a closing of the switch.

The switch 125 comprises a housing 126 composed of insulating material and through whose bottom is slidably mounted a plunger 127 which is actuated upward by the extension 123. The upper end of the plunger is operably related to an electrically conducting, spring leaf 128 whose left end is secured to a shim 129 which abuts the cover of the housing 126 by means of a screw 130 in conducting relation to the spring leaf 128 and a wire 131 is connected to the screw. Integrally formed with the opposite or free end of the spring leaf 128 and extending in spaced relation on opposite sides and towards the fixed end of the leaf is a pair of members 132, each of which is shaped in the manner shown in Fig. 11, and the free end of each member freely seats within a socket 133 in the shim 129 so that the members may rock upwardly and downwardly relative to the shim. Only one of the members 132 is illustrated in Fig. 11. The switch is shown in closed position with the free end of the spring leaf 128 resting on a metallic block 134 secured to the bottom of the housing 126 by a screw 135 which is in electrically conducting relation to the block and to the screw one end of a wire 136 is connected. When the plunger 127 is moved upwardly, the spring leaf 128 is snapped upwardly to place its free end in contact with a block 137 secured to the cover of the housing 126 which is the open circuit position of the switch. This movement of the leaf spring 128 is permitted by a slot 137ᵃ cut in the shim 129 which provides clearance for the flexing of the spring. When pressure on the plunger 127 is relieved sufficiently, the spring leaf 128 automatically returns to the closed circuit position shown in Fig. 11. For further structural details of the switch 125 and the theory of its operation, reference may be had to the last noted patent.

The control shown in Figs. 10 and 11 may be used with the heating system shown in Fig. 1, the wires 131 and 136 being connected to the electrical circuit of the latter figure in the same manner as the wires 28 and 27. This control performs the same function in relation to a heating system as does the controls shown in Figs. 3 and 4 and its general characteristics are the same, except that regulation is effected by pressure changes in the fluid enclosed in the tube 110 as the heat conditioning thereof varies with fluctuations in the temperatures, outdoor and heating medium, to which it is simultaneously subjected. Adjustment of this control is secured by the nut 122 and by varying the length of the tube 110 that is exposed outdoors.

A further form of outdoor control is illustrated in Fig. 12 which is similar to that shown in Figs. 10 and 11 in that control is exercised by pressure changes in a heat expansible fluid enclosed in a heat conducting tube subjected to the outside weather and the circulating fluid of the heating system, but differs therefrom in that the tube is associated with an extension in the form of a Bourdon tube whose free end is connected to a circuit controlling switch.

Referring to Fig. 12, the numeral 138 designates a heat conducting tube which extends through and projects beyond opposite sides of a building wall 139 and is insulated therefrom by a sleeve 140. The outer or weather end of the tube is closed and the opposite end extends through a housing 141 whose opposite ends are closed by plugs 142 and 143 which encircle the tube. Between the plugs, the housing 141 is annularly chambered, as at 144, and through this chamber flows heating system fluid in heat exchanging relation to the tube 138, the fluid being supplied and evacuated through pipes 145 and 146, respectively, which may be connected to the heating system as shown in Fig. 1.

The tube 138 extends beyond the plug 143 and is secured to one end of a Bourdon tube 147, this end therefore constituting the fixed end of the Bourdon tube whose interior communicates with the interior of the straight tube 138. The Bourdon tube may be enclosed in a suitable housing 148 and its free end is connected to one end of a metallic switch lever 149 pivoted at 150 in the housing. The lever carries an electrical contact 151 which when the lever is rocked to a closed position engages a fixed contact 152 supported by the housing 148. A fixed magnet 153, also carried by the housing, is disposed adjacent the free end of the lever to accelerate its movement in a direction to engage the contacts 151 and 152. Wires 154 and 155 connect the fulcrum 150 and the fixed contact 152, respectively, to the electrical circuit shown in Fig. 1. Since the disclosure of the switch mechanism in the housing 148 is largely diagrammatic, it will be understood that the pivot 150, contact 152 and magnet 153 will be suitably insulated from the housing, and the lever 149 will also be insulated from the connected end of the Bourdon tube 147.

The straight tube 138 and the Bourdon tube 147 are filled with a suitable gas or liquid which is sealed in the indicated members and its operating characteristics therefore will be similar to the Fig. 10 type, but modified by the Bourdon tube 147. The circuit controlling lever 149 is shown in open position indicating satisfied heat demand in the space being heated. When the fluid in the tube 138 and the Bourdon tube 147 chills sufficiently to effect a contraction of the Bourdon tube, the lever 149 will be rocked to close the contacts 151 and 152 and the ensuing action will through the associated electrical circuit effect a resumption of the heat supply. Otherwise, the characteristics of this modification in relation to the heating system and its ability to coordinate the effects of outside weather, including wind action, and the heating fluid temperatures on a heat conducting tube are identical with the other forms above described. It is contemplated that the Fig. 12 modification, due to the use of a Bourdon tube and the connected lever, may be characterized by an increased mechanical advantage for the purpose of circuit control, relative to the form shown in Fig. 10. Adjustment is effected by varying the length of the tube 138 exposed to the outside weather as already noted. The Bourdon tube is regarded as the equivalent of any extensible chamber, such as a bellows, which encloses a fluid and one end of which is free to move in response to pressure variations in the fluid.

In Fig. 13 is illustrated a modified arrangement for adjusting the control shown in Figs. 4 and 7 and wherein like parts in these figures are identified by the same numerals.

An Invar rod 156, corresponding to the rod 91, extends through the control tube 69 in the manner described above and its left or inner end is threaded through a plug 157 mounted in the adjacent end of the tube 69. The threaded end of the rod 156 is continued through an adjusting nut 158 having an annular boss 159 which is journaled in upper and lower arms 160—160 integrally formed with and extending laterally from the heat block 64. An annular groove 161 is formed in the boss 159 and fitting within the groove are the ends of a plurality of screws 162 which are threaded through the arms 160. Hence, the nut 158 is conditioned for rotation only to thereby advance or retract the rod 156 which imparts like movements to the control tube 69 and heat supply sleeve 79 since the rod 156 does not rotate within the plug 157.

A heating system which is associated with any of the above outdoor controls will be conditioned to maintain an indoor temperature that is satisfactory for maximum body comfort. A substantial balance is maintained between heat supply and heat loss and there is always a sufficient amount of heat in the radiators to insure circulation of warm air in the room, thus preventing stratification. Closer regulation of the desired temperature in the room is therefore possible, as compared with the present indoor system of control, and heat demands which obviously vary with changes in the weather are efficiently handled by my improved control which anticipates the interior requirements for heat. Moreover, stand-by heat losses of the boiler are held to a minimum because the firing periods of the firing means are elastically related to the demands for heat in the space being heated, lower temperatures in the boiler being possible on mild days than on colder days, thus enabling certain economies in overall operation.

An outstanding feature of the invention is the use of a heat conducting tube as the correlating factor between the outside temperatures and those of the heating fluid. The use of such a tube enables the structure to respond to increased heat demands on windy days since the dissipation of heat along the tube will clearly be greater than on still days even though the respective outdoor temperatures are identical. This variation in heat dissipation or rate of heat loss heat conditions the tube to provide the required control, regardless of the type employed. The controls above described are not restricted to the continuous flow heating system shown in Fig. 1, nor to the specific electrical circuits illustrated, but may also be used with systems employing intermittent flow and with other electrical circuits.

Where any of the above controls are used with a hand fired system, they would be connected to the boiler or furnace dampers for regulating the burning rate of the fuel.

I claim:

1. Control means for a heating system for maintaining the temperature of the space to be heated in relation to varying outdoor weather conditions comprising a heat conducting tube having one end subjected to outdoor weather, means for simultaneously supplying heat from the heating medium to limited area portions of the opposite end and an intermediate part of the tube, means for varying the amount of heat supplied to the intermediate tube part to thereby vary the total amount of heat supplied to the tube, and means responsive to length changes in the tube effected by the heat supplied thereto and weather conditioning thereof for determining the supply of heat to the space.

2. Control means for a heating system for maintaining the temperature of the space to be heated in relation to varying outdoor weather conditions comprising a heat conducting tube having one end subjected to outdoor weather, means for simultaneously supplying heat from the heating medium to limited area portions of the opposite end and an intermediate part of the tube, means for simultaneously varying the amounts of heat supplied to said opposite end and intermediate part to thereby vary the total amount of heat supplied to the tube, and means responsive to length changes in the tube effected by the heat supplied thereto and weather conditioning thereof for determining the supply of heat to the space.

3. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, and means responsive to length changes in the first tube effected by the total heat supplied thereto and the weather conditioning thereof for determining the supply of heat to the space.

4. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, means for varying the area contact of the second tube with the heat block to thereby vary the total amount of heat supplied to the first tube from the heat block, and means responsive to length changes in the first tube effected by the total heat supplied thereto and the weather conditioning thereof for determining the supply of heat to the space.

5. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube and having one end fastened in heat exchange relation to an intermediate part of the first tube, the opposite end of the second tube being in heat exchange relation to the heat block, means for shifting the first tube endwise to thereby vary the areas of contact between the heat block and first and second tubes, respectively, and the total amount of heat supplied to the first tube from the heat block, and means responsive to length changes in the first tube effected by the total heat supplied thereto and the weather conditioning thereof for determining the supply of heat to the space.

6. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, both tubes being composed of a material having a relatively high coefficient of expansion, a rod composed of a material having a substantially zero coefficient of expansion extending through the first tube in spaced relation thereto and having one end secured to the heat block end of the first tube, and electrical switch means operably related to the other end of the rod and the end of the first tube adjacent thereto, the switch means being responsive to changes in length of the first tube effected by the heat supplied thereto and the weather conditioning thereof for determining the supply of heat to the space.

7. Control means for a heating system for maintaining the temperature of the space to be heated in relation to varying outdoor weather conditions comprising a first heat conducting tube having one end subjected to outdoor weather, a heat block through which the heating medium is circulated in heat exchange relation with the opposite end of the tube, a second heat conducting tube surrounding the first tube and having one end fastened in heat exchange relation to an intermediate part of the first tube, the opposite end of the second tube being in heat exchange relation with the heat block, both tubes being composed of a material having a relatively high coefficient of expansion, a rod composed of a material having a substantially zero coefficient of expansion extending through the first tube in spaced relation thereto and having one end secured to the heat block end of the first tube, means for shifting the first tube endwise to thereby vary the areas of contact between the heat block and first and second tubes, respectively, and the total amount of heat supplied to the first tube from the heat block, and electrical switch means operably related to the other end of the rod and the end of the first tube adjacent thereto, the switch means being responsive to changes in length of the first tube effected by the heat supplied thereto and the weather conditioning thereof for determining the supply of heat to the space.

8. Control means for a heating system for maintaining the temperature of the space to be heated in relation to varying outdoor weather conditions comprising a first heat conducting tube having one end subjected to outdoor weather, a heat block through which the heating medium is circulated, the opposite end of the first tube being slidable through and in heat exchange relation to the heat block, a second heat conducting tube surrounding the first tube and having one end fastened in heat exchange relation to an intermediate part of the first tube, the opposite end of the second tube being slidably mounted on and in heat exchange relation to the heat block, means for shifting the first tube endwise to thereby vary the areas of contact between the heat block and first and second tubes, respectively, and the total amount of heat supplied to the first tube from the heat block, and means responsive to length changes in the first tube effected by the total heat supplied thereto and the weather conditioning thereof for determining the supply of heat to the space.

9. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, means for shifting the first tube endwise to vary the heat travel distance between the heat block and the weather end of the first tube, means for varying the area contact of the second tube with the heat block to thereby vary the amount of heat supplied to the first tube by the second tube, and means responsive to length changes in the first tube effected by the heat supplied thereto and the weather conditioning thereof for determining the supply of heat to the space.

10. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, means for simultaneously shifting the first and second tubes endwise in the same direction, the shifting of the first tube varying the heat travel distance between the heat block and the weather end of the first tube and the shifting of the second tube varying the area contact thereof with the heat block to thereby vary the amount of heat supplied to the first tube by the second tube, and means responsive to length changes in the first tube effected by the heat supplied thereto and the weather conditioning thereof for determining the supply of heat to the space.

11. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, both tubes being composed of a material having a relatively high coefficient of expansion, a rod composed of a material having a substantially zero coefficient of expansion extending through the first tube in spaced relation thereto and having one end secured to the heat block end of the first tube, means for shifting the first tube endwise to vary the heat travel distance between the heat block and the weather end of the first tube, means for varying the area contact of the second tube with the heat block to thereby vary the amount of heat supplied to the first tube by the second tube, and electrical switch means operably related to the other end of the rod and the end of the first tube adjacent thereto, the switch means being responsive to changes in length of the first tube effected by the heat supplied thereto and the weather conditioning thereof for determining the supply of heat to the space.

12. Control means for a heating system for maintaining the temperature of the space to be heated in relation to varying outdoor weather conditions comprising a first heat conducting tube having one end subjected to outdoor weather, a heat block through which the heating medium is circulated in heat exchange relation to the opposite end of the tube, a second heat conducting tube surrounding the first tube, the opposite ends of the second tube being in heat exchange relation to the heat block and an intermediate part of the first tube, respectively, both tubes being composed of a material having a relatively high coefficient of expansion, a rod composed of a material having a substantially zero coefficient of expansion extending through the first tube in spaced relation thereto and having one end secured to the heat block end of the first tube, means for simultaneously shifting the first and second tubes endwise in the same direction, the shifting of the first tube varying the heat travel distance between the heat block and the weather end of the first tube and the shifting of the second tube varying the area contact thereof with the heat block to thereby vary the amount of heat supplied to the first tube by the second tube, and electrical switch means operably related to the other end of the rod and the end of the first tube adjacent thereto, the switch means being responsive to changes in length of the first tube effected by the heat supplied thereto and the weather conditioning thereof for determining the supply of heat to the space.

13. Control means for a heating system for maintaining the temperature of the space to be heated in relation to varying outdoor weather conditions comprising a first elongated, heat conducting member having one end subjected to outdoor weather, a heat block through which the heating medium is circulated in heat exchange relation to the opposite end of the member, a second elongated, heat conducting member positioned adjacent to the first member, the opposite ends of the second member being in heat exchange relation to the heat block and an intermediate part of the first member, respectively, means for shifting the first member endwise to vary the heat travel distance between the heat block and the weather end of the first member, means for varying the area contact of the second member with the heat block to thereby vary the amount of heat supplied to the first member by the second member, and means responsive to length changes in the first member effected by the heat supplied thereto and the weather conditioning thereof for determining the supply of heat to the space.

14. Control means for a heating system for maintaining the temperature of the space to be heated in relation to varying outdoor weather conditions comprising a first elongated, heat conducting member having one end subjected to outdoor weather, a heat block through which the heating medium is circulated in heat exchange relation to the opposite end of the member, a second elongated, heat conducting member positioned adjacent to the first member, the opposite ends of the second member being in heat exchange relation to the heat block and an intermediate part of the first member, respectively, means for simultaneously shifting the first and second members endwise in the same direction, the shifting of the first member varying the heat travel distance between the heat block and the weather end of the first member and the shift of the second member varying the area contact thereof with the heat block to thereby vary the amount of heat supplied to the first member by the second member, and means responsive to length changes in the first member effected by the heat supplied thereto and the weather conditioning thereof for determining the supply of heat to the space.

15. Control means for a heating system for maintaining the temperature of the space to be heated in relation to varying outdoor weather conditions comprising a first elongated, heat conducting member having one end subjected to outdoor weather, a heat block through which the heating medium is circulated in heat exchange relation to the opposite end of the member, a second elongated, heat conducting member positioned adjacent the first member, the opposite ends of the second member being in heat exchange relation to the heat block and an intermediate part of the first member, respectively, both members being composed of a material having a relatively high coefficient of expansion, a rod composed of a material having a substantially zero coefficient of expansion extending along the first member in spaced relation thereto and having one end secured to the heat block end of the first member, means for shifting the first member endwise to vary the heat travel distance between the heat block and the weather end of the first member, means for varying the area contact of the second member with the heat block to thereby vary the amount of heat supplied to the first member by the second member, and electrical switch means operably related to the other end of the rod and the end of the first member adjacent thereto, the switch means being responsive to changes in length of the first member effected by the heat supplied thereto and the weather conditioning thereof for determining the supply of heat to the space.

16. Control means for a heating system for maintaining the temperature of the space to be heated in relation to varying outdoor weather conditions comprising a first elongated, heat conducting member having one end subjected to outdoor weather, a heat block through which the heating medium is circulated in heat exchange relation to the opposite end of the member, a second elongated, heat conducting member positioned adjacent the first member, the opposite ends of the second member being in heat exchange relation to the heat block and an intermediate part of the first member, respectively, both members being composed of a material having a relatively high coefficient of expansion, a rod composed of a material having a substantially zero coefficient of expansion extending along the first member in spaced relation thereto and having one end secured to the heat block end of the first member, means for simultaneously shifting the first and second members endwise in the same direction, the shifting of the first member varying the heat travel distance between the heat block and the weather end of the first member and the shifting of the second member varying the area contact thereof with the heat block to thereby vary the amount of heat supplied to the first member by the second member, and electrical switch means operably related to the other end of the rod and the end of the first member adjacent thereto, the switch means being responsive to changes in length of the first member effected by the heat supplied thereto and the weather conditioning thereof for determining the supply of heat to the space.

17. Control means for a heating system for maintaining the temperature of the space to be heated in relation to varying outdoor weather conditions comprising an elongated, heat conducting member having one end subjected to outdoor weather, means for simultaneously supplying heat from the heating medium to limited area portions of the opposite end and an intermediate part of the member, means for varying the amount of heat supplied to the intermediate member part to thereby vary the total amount of heat supplied to the member, and means responsive to length changes in the member effected by the heat supplied thereto and weather conditioning thereof for determining the supply of heat to the space.

18. Control means for a heating system for maintaining the temperature of the space to be heated in relation to varying outdoor weather conditions comprising an elongated, heat conducting member having one end subjected to outdoor weather, means for simultaneously supplying heat from the heating medium to limited area portions of the opposite end and an intermediate part of the member, means for simultaneously varying the amounts of heat supplied to said opposite end and intermediate part to thereby vary the total amount of heat supplied to the member, and means responsive to length changes in the member effected by the heat supplied thereto and weather conditioning thereof for determining the supply of heat to the space.

EDWIN B. TIDD.

References Cited in the file of this patent

UNITED STATES PATENTS

| Number | Name | Date |
|---|---|---|
| 1,358,073 | Fulton | Nov. 9, 1920 |
| 1,969,968 | Dever | Aug. 14, 1934 |
| 1,981,679 | Stem | Nov. 20, 1934 |
| 2,290,985 | McElgin | July 28, 1942 |